US009162390B2

(12) United States Patent
Jannot et al.

(10) Patent No.: US 9,162,390 B2
(45) Date of Patent: Oct. 20, 2015

(54) PROCESS FOR FASTENING AN ACCESSORY TO A PLASTIC HOLLOW BODY

(75) Inventors: Frederic Jannot, Bousval (BE); Bjorn Criel, Sint-Martens-Lennik (BE); Pierre-Francois Tardy, Brussels (BE); Ralph Pohlmann, Margny-les-Compiegne (FR)

(73) Assignee: INERGY AUTOMOTIVE SYSTEMS RESEARCH (Societe Anonyme), Bruxelles (BE)

( * ) Notice: Subject to any disclaimer, the term of this patent is extended or adjusted under 35 U.S.C. 154(b) by 231 days.

(21) Appl. No.: 13/057,203

(22) PCT Filed: Aug. 6, 2009

(86) PCT No.: PCT/EP2009/060198
§ 371 (c)(1),
(2), (4) Date: Feb. 2, 2011

(87) PCT Pub. No.: WO2010/015673
PCT Pub. Date: Feb. 11, 2010

(65) Prior Publication Data
US 2011/0131788 A1 Jun. 9, 2011

(30) Foreign Application Priority Data

Aug. 7, 2008 (FR) ..................................... 08 55459

(51) Int. Cl.
*B29C 65/60* (2006.01)
*B29C 65/02* (2006.01)
(Continued)

(52) U.S. Cl.
CPC ............... *B29C 65/028* (2013.01); *B29C 49/20* (2013.01); *B29C 65/606* (2013.01);
(Continued)

(58) Field of Classification Search
CPC ......... B21J 15/02; B62D 21/02; B65D 90/08; F17C 2209/221; B60K 15/03177; B60K 15/03; B60K 2015/03453; B60K 2015/0346; B29C 66/54; B29C 66/8322; B29C 57/025; B29C 65/606; B29C 49/06; B29C 49/4802; B29C 49/541; B29C 2049/4807; B29C 49/48; B29C 2791/007; B29C 47/0054; B29C 2791/006; B29C 2049/206; B29C 51/12; B29C 49/0047; B29C 2049/2073; B29C 47/0066; B29C 2049/0057; B29C 65/609; B29C 49/22; B29C 47/0026; B29C 65/028; B29C 66/61; B29C 49/20; B29C 47/062; B29C 66/532; B29C 51/267; B29C 2049/2008; B29C 2793/0063; B29C 2793/0081; B29K 2105/06; B29K 2023/086; B29K 2077/00; B29K 2995/0067; B29K 2105/0085; B29K 2995/0069; B29K 2021/003; B29K 2021/12; B29K 2023/00; B29K 2067/00; B29K 2223/00; B29K 2023/065; B29L 2031/7172; B29L 2009/00; A45C 11/20; B29B 2911/1402; B29B 2911/14026; B29B 2911/14033
USPC ........... 29/463, 525.01, 525.06, 527.1, 897.2; 280/834; 220/4.12–4.14, 562, 694; 264/249, 523, 537, 539, 540, 531, 534
See application file for complete search history.

(56) References Cited

U.S. PATENT DOCUMENTS 5,308,427 A * 5/1994 Duhaime et al. ............... 156/245
5,445,783 A * 8/1995 Irish et al. ...................... 264/515
(Continued)

FOREIGN PATENT DOCUMENTS

CA     2641463 A1    8/2007
DE    10010900 A1    9/2001
(Continued)

OTHER PUBLICATIONS

Bienhuels et al.; Plastic Hollow Body; Jan. 27, 2010, English Machine Translation pp. 1-5.*
(Continued)

*Primary Examiner* — Jermie Cozart
*Assistant Examiner* — Bayan Salone
(74) *Attorney, Agent, or Firm* — Oblon, McClelland, Maier & Neustadt, L.L.P.

(57) ABSTRACT

Process for fastening an accessory to a hollow body obtained by molding a molten plastic parison, this fastening taking place by snap-riveting with the aid of a tool during the actual molding of the parison, according to which, before carrying out the snap-riveting, the parison is locally deformed so as to surround the snap-riveting zone with a dome, the snap-riveting zone being also in relief (hollow) compared to the rest of the accessory.

15 Claims, 3 Drawing Sheets

(51) Int. Cl.
*B29C 65/00* (2006.01)
*B29C 49/20* (2006.01)
*B60K 15/03* (2006.01)
*B29C 47/06* (2006.01)
*B29C 51/12* (2006.01)
*B29C 51/26* (2006.01)
*B29C 49/04* (2006.01)
*B29C 49/00* (2006.01)
*B29C 47/00* (2006.01)
*B29L 31/00* (2006.01)
*B29C 49/22* (2006.01)
*B29K 21/00* (2006.01)
*B29K 23/00* (2006.01)
*B29K 67/00* (2006.01)
*B29K 77/00* (2006.01)
*B29K 101/12* (2006.01)
*B29K 105/00* (2006.01)
*B29K 223/00* (2006.01)
*B29L 9/00* (2006.01)

(52) U.S. Cl.
CPC ............. *B29C 66/532* (2013.01); *B29C 66/54* (2013.01); *B29C 66/61* (2013.01); *B60K 15/03177* (2013.01); *B29C 47/0026* (2013.01); *B29C 47/0054* (2013.01); *B29C 47/0066* (2013.01); *B29C 47/062* (2013.01); *B29C 49/0047* (2013.01); *B29C 49/04* (2013.01); *B29C 49/22* (2013.01); *B29C 51/12* (2013.01); *B29C 51/267* (2013.01); *B29C 65/609* (2013.01); *B29C 2049/0057* (2013.01); *B29C 2049/206* (2013.01); *B29C 2049/2008* (2013.01); *B29C 2049/2073* (2013.01); *B29C 2791/006* (2013.01); *B29C 2791/007* (2013.01); *B29C 2793/0063* (2013.01); *B29C 2793/0081* (2013.01); *B29K 2021/003* (2013.01); *B29K 2023/00* (2013.01); *B29K 2023/065* (2013.01); *B29K 2023/086* (2013.01); *B29K 2067/00* (2013.01); *B29K 2077/00* (2013.01); *B29K 2101/12* (2013.01); *B29K 2105/0085* (2013.01); *B29K 2223/00* (2013.01); *B29K 2995/0067* (2013.01); *B29K 2995/0069* (2013.01); *B29L 2009/00* (2013.01); *B29L 2031/7172* (2013.01); *Y10T 29/49956* (2015.01)

(56) References Cited

U.S. PATENT DOCUMENTS

| | | | | |
|---|---|---|---|---|
| 5,891,385 A * | 4/1999 | Cerbelle et al. | ............... | 264/515 |
| 6,527,892 B1 * | 3/2003 | Gombert et al. | ............... | 156/156 |
| 6,571,978 B1 * | 6/2003 | Puempel et al. | ............... | 220/562 |
| 6,726,967 B2 * | 4/2004 | Vorenkamp et al. | ......... | 428/34.1 |
| 6,814,921 B1 * | 11/2004 | Van Schaftingen et al. | .. | 264/513 |
| 6,844,037 B2 * | 1/2005 | Gombert et al. | ............... | 428/35.7 |
| 6,866,812 B2 * | 3/2005 | Van Schaftingen et al. | .. | 264/515 |
| 6,978,802 B2 * | 12/2005 | Hagano et al. | ................. | 137/574 |
| 7,131,452 B2 * | 11/2006 | Potter et al. | ................ | 137/15.17 |
| 7,166,253 B2 * | 1/2007 | Van Schaftingen et al. | .. | 264/515 |
| 7,168,466 B2 * | 1/2007 | Ganachaud et al. | ........... | 141/286 |
| 7,290,675 B2 * | 11/2007 | Gombert et al. | ............... | 220/562 |
| 7,455,190 B2 * | 11/2008 | Potter et al. | ................. | 220/4.14 |
| 7,829,819 B2 * | 11/2010 | DeMaria et al. | ............... | 219/122 |
| 7,861,885 B2 * | 1/2011 | Borchert et al. | ............... | 220/562 |
| 8,122,604 B2 * | 2/2012 | Jannot et al. | .................. | 29/897.2 |
| 8,163,228 B2 * | 4/2012 | Criel et al. | ..................... | 264/516 |
| 8,209,854 B2 * | 7/2012 | Blieux et al. | .................... | 29/801 |
| 8,268,212 B2 * | 9/2012 | Criel et al. | ..................... | 264/152 |
| 8,470,235 B2 * | 6/2013 | Criel et al. | ..................... | 264/545 |
| 8,584,339 B2 * | 11/2013 | Mbog et al. | ...................... | 29/464 |
| 8,590,132 B2 * | 11/2013 | Eulitz et al. | ..................... | 29/432 |
| 8,591,798 B2 * | 11/2013 | Criel et al. | ..................... | 264/515 |
| 8,631,556 B2 * | 1/2014 | Pohlmann et al. | ............ | 29/527.1 |
| 8,695,203 B2 * | 4/2014 | Jannot et al. | .................. | 29/527.1 |
| 2001/0015513 A1 * | 8/2001 | Schaftingen et al. | ......... | 264/515 |
| 2002/0020487 A1 * | 2/2002 | Vorenkamp et al. | ..... | 156/244.19 |
| 2002/0043533 A1 * | 4/2002 | Gombert et al. | ............. | 220/4.13 |
| 2005/0205156 A1 * | 9/2005 | Ganachaud et al. | .......... | 141/286 |
| 2005/0284871 A1 * | 12/2005 | Leonard et al. | ................ | 220/562 |
| 2005/0284872 A1 * | 12/2005 | Gombert et al. | ............... | 220/562 |
| 2007/0290414 A1 * | 12/2007 | Criel | ............................. | 264/531 |
| 2008/0006625 A1 * | 1/2008 | Borchert et al. | .............. | 220/4.13 |
| 2008/0149642 A1 * | 6/2008 | Borchert et al. | .............. | 220/562 |
| 2008/0164639 A1 * | 7/2008 | Criel et al. | ..................... | 264/511 |
| 2009/0019683 A1 * | 1/2009 | Jannot et al. | ..................... | 29/428 |
| 2009/0026664 A1 * | 1/2009 | Criel et al. | ..................... | 264/545 |
| 2009/0152263 A1 * | 6/2009 | Criel et al. | ..................... | 220/4.14 |
| 2009/0166367 A1 * | 7/2009 | Blieux et al. | .................. | 220/694 |
| 2009/0166934 A1 * | 7/2009 | Masse et al. | .................... | 264/537 |
| 2009/0250161 A1 * | 10/2009 | Mabed et al. | ............... | 156/272.2 |
| 2009/0250846 A1 * | 10/2009 | Criel et al. | ..................... | 264/511 |
| 2010/0126659 A1 * | 5/2010 | Roos et al. | ...................... | 156/245 |
| 2010/0212806 A1 * | 8/2010 | Lemoine et al. | ................. | 156/92 |
| 2011/0068515 A1 * | 3/2011 | Jannot et al. | .................... | 264/516 |
| 2011/0131771 A1 * | 6/2011 | Jannot et al. | ...................... | 24/571 |
| 2011/0131788 A1 * | 6/2011 | Jannot et al. | .................. | 29/525.06 |
| 2011/0131789 A1 * | 6/2011 | Pohlmann et al. | .......... | 29/525.06 |
| 2011/0139342 A1 * | 6/2011 | Jannot et al. | ..................... | 156/92 |
| 2011/0220226 A1 * | 9/2011 | Devulder et al. | .............. | 137/588 |
| 2011/0221104 A1 * | 9/2011 | Criel et al. | ..................... | 264/526 |
| 2011/0266723 A1 * | 11/2011 | Criel et al. | ..................... | 264/526 |
| 2012/0326357 A1 * | 12/2012 | Roos et al. | ...................... | 264/529 |
| 2014/0034649 A1 * | 2/2014 | Criel et al. | ..................... | 220/562 |

FOREIGN PATENT DOCUMENTS

| | | | | |
|---|---|---|---|---|
| DE | 102006006469 A1 | | 8/2007 | |
| EP | 1110697 A2 | | 6/2001 | |
| EP | 2147772 | * | 1/2010 | ............ B29C 49/00 |
| FR | 2875430 | * | 9/2004 | ............ B29C 70/68 |
| GB | 1410215 A | | 10/1975 | |
| WO | WO 2004024487 A1 | | 3/2004 | |
| WO | WO 2006008308 A1 * | | 1/2006 | |
| WO | WO 2007090453 A2 * | | 8/2007 | ............ B29C 49/00 |
| WO | WO 2007093573 A1 | | 8/2007 | |
| WO | WO 2009007433 A1 | | 1/2009 | |
| WO | WO 2010015615 A1 | | 2/2010 | |
| WO | WO 2010015670 A1 | | 2/2010 | |
| WO | WO 2010023212 A2 | | 3/2010 | |

OTHER PUBLICATIONS

U.S. Appl. No. 13/057,180, Frederic Jannot, et al., filed Feb. 2, 2011.
U.S. Appl. No. 13/057,185, Frederic Jannot, et al., filed Feb. 2, 2009.
U.S. Appl. No. 13/059,146, Ralph Pohlman, et al., filed Feb. 15, 2011.

* cited by examiner

PROCESS FOR FASTENING AN ACCESSORY TO A PLASTIC HOLLOW BODY

CROSS-REFERENCE TO RELATED APPLICATIONS

This application is a U.S. national stage application under 35 U.S.C. §371 of International Application No. PCT/EP2009/060198 filed Aug. 6, 2009, which claims priority to French Application No. FR 08.55459 filed Aug. 7, 2008, this application being herein incorporated by reference in its entirety for all purposes.

TECHNICAL FIELD OF THE INVENTION

The present invention relates to a process for fastening an accessory to a wall of a hollow body, and in particular of a fuel tank (FT), made of plastic.

BACKGROUND OF THE INVENTION

Fuel tanks on board vehicles of various kinds must generally meet sealing and permeability standards in relation to the type of usage for which they are designed and the environmental requirements with which they must comply. Both in Europe and throughout the world we are currently experiencing a considerable tightening of the requirements concerned with limiting the emissions of pollutants into the atmosphere and into the environment in general.

To limit these emissions, care is taken in particular to position the accessories (ventilation lines, valves, baffles, stiffeners, etc.) inside the tank and, to limit the number of openings through its wall, the Applicant has developed a method of initially molding a parison that includes at least one slot for introducing thereinto (and fastening thereto) accessories during the actual molding of the tank and thus avoiding drilling openings (see, in particular, Application EP 1 110 697).

The Applicant has also developed a particular method for this fastening (in situ snap-riveting, the subject of Application WO 2006/008308, the content of which is, for this purpose, incorporated by reference into the present application) and also improvements that are respectively the subject of international Applications WO 2007/093573 and PCT/EP 2008/059042 in the name of the Applicant, the content of which is also incorporated by reference into the present application.

The object of the aforementioned Application WO 2007/093573 is to provide a process that allows an accessory to be incorporated into a plastic fuel tank during its manufacture by molding, without generating deformations after the tank has cooled, when the accessory is fastened thereto. In this process, the accessory is provided, at least one of its fastening points, with a fastening part such that, although the accessory is fastened to the wall of the tank, it can move relative to the corresponding fastening point on the wall of the tank.

Although this approach makes it possible to solve the deformations generated by the differential shrinkage of the accessory and of the tank during post-molding cooling, the Applicant has however observed the formation of a hollow (depression or concave relief when seen from outside the tank, convex relief when seen from the inside) in the wall of the tank and to the right of the location where the accessory is fastened. Moreover, depending on the geometry of the accessory, the Applicant has also noticed in certain cases the appearance of beads of material trapping at least one portion of the accessory in the wall of the tank, which adversely affects the aforementioned mobility and the homogeneity of the parison (with leakage risks that result therefrom).

SUMMARY

The object of the invention is hence to provide a process that makes it possible to solve these problems and to fasten an accessory to a hollow body while greatly limiting the deformations of its wall.

This goal is achieved by raising (putting in relief) the snap-riveting zone both as regards the rest of the tank wall (outside this zone/area) as regards the rest of the accessory.

For this purpose, the invention relates to a process for fastening an accessory to a hollow body obtained by molding a molten plastic parison, this fastening taking place by snap-riveting with the aid of a tool during the actual molding of the parison, according to which, before carrying out the snap-riveting, the parison is locally deformed so as to surround the snap-riveting zone with a dome (or relief that is concave when seen from the outside of the tank and convex when seen from the inside), the snap-riveting zone being also in relief (hollow) compared to the rest of the accessory.

Thus, for example, the Applicant has surprisingly observed that the fact of fastening an accessory with 3 snap rivets having a diameter of 1 cm each located on a dome of around 3 cm in diameter and 1 cm in height made it possible to reduce the depth of the hollow formed to the right of the accessory by a factor of 7. The choice of 3 snap rivets results from the fact that to obtain a fastening that has perfect isostatism, it is ideally necessary to provide 3 fastening points that unequivocally define a fastening plane for the part, thus avoiding an unsatisfactory fastening.

The hollow body to which the invention applies is preferably a tank for a motor vehicle intended to contain fuel, a pollution-control additive or any other liquid on board the vehicle. It may be a fuel tank (FT) or a urea tank (urea being an additive that is used to purify the exhaust gases of $NO_x$). It applies particularly well to FTs.

BRIEF DESCRIPTION OF THE DRAWINGS

For a detailed description of the invention, reference will now be made to the accompanying drawings in which.

DETAILED DESCRIPTION OF PREFERRED EMBODIMENTS

Figure 1:
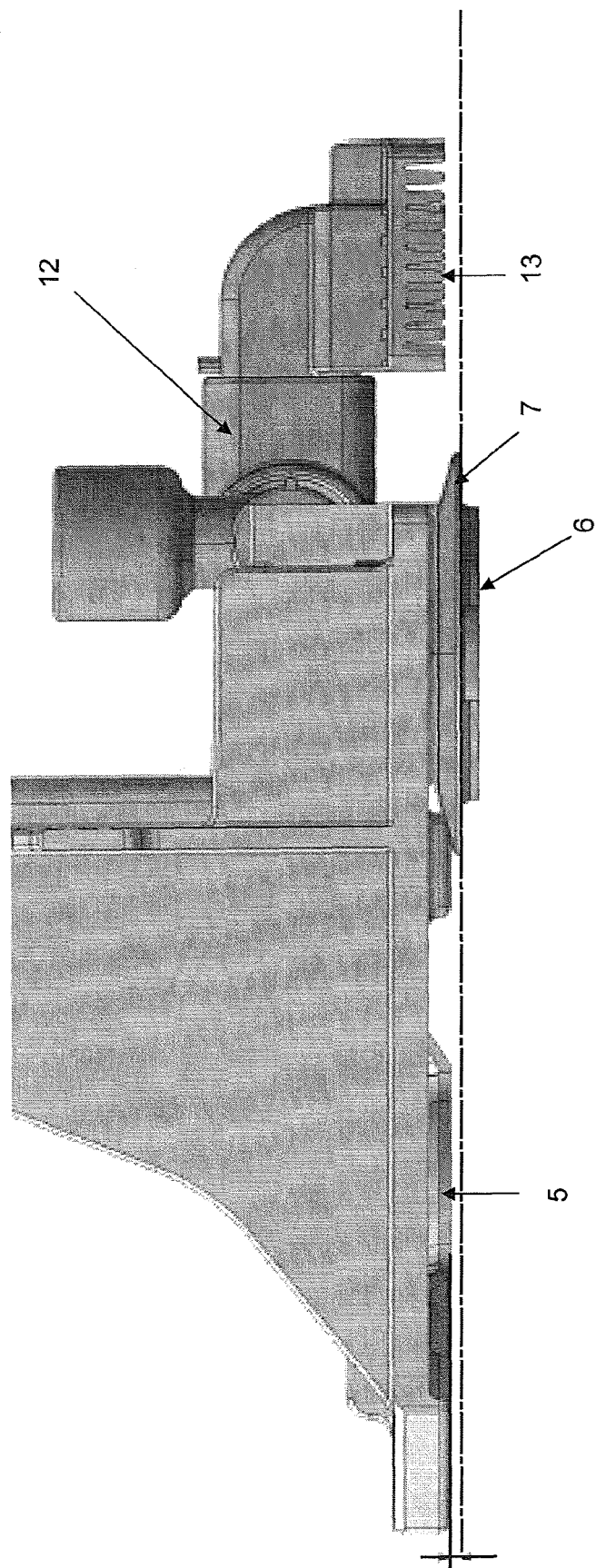
FIG. 1 illustrates one view of an accessory intended for the process of the invention, the accessory being a gauge support for a fuel tank.

The term "FT" is understood to mean an impermeable tank, able to store fuel under diverse and varied usage and environmental conditions. An example of this tank is that with which motor vehicles are fitted.

The term "plastic" means any material comprising at least one synthetic resin polymer.

Any type of plastic may be suitable. Particularly suitable plastics belong to the category of thermoplastics.

The term "thermoplastic" is understood to mean any thermoplastic polymer, including thermoplastic elastomers, and also blends thereof. The term "polymer" is understood to mean both homopolymers and copolymers (especially binary or ternary copolymers). Examples of such copolymers are, in a non-limiting way: random copolymers, linear block copolymers, other block copolymers and graft copolymers.

Any type of thermoplastic polymer or copolymer, the melting point of which is below the decomposition temperature, is suitable. Synthetic thermoplastics having a melting range spread over at least 10 degrees Celsius are particularly suitable. Examples of such materials include those that exhibit polydispersion in their molecular weight.

In particular, it is possible to use polyolefins, thermoplastic polyesters, polyketones, polyamides and copolymers thereof. A blend of polymers or copolymers may also be used; similarly it is also possible to use a blend of polymeric materials with inorganic, organic and/or natural fillers such as, for example but in a non-limiting way: carbon, salts and other inorganic derivatives, natural or polymeric fibres. It is also possible to use multilayer structures composed of stacked and joined layers comprising at least one of the polymers or copolymers described above.

One polymer that is often used is polyethylene. Excellent results have been obtained with high-density polyethylene (HDPE).

The wall of the tank may be composed of a single thermoplastic layer, or of two layers. One or more other possible additional layers may, advantageously, be composed of layers made of a barrier material to liquids and/or gases. Preferably, the nature and thickness of the barrier layer are chosen so as to minimize the permeability of liquids and gases in contact with the internal surface of the tank. Preferably, this layer is based on a barrier resin, that is to say a resin that is impermeable to the fuel such as, for example, EVOH (a partially hydrolysed ethylene/vinyl acetate copolymer). Alternatively, the tank may be subjected to a surface treatment (fluorination or sulfonation) for the purpose of making it impermeable to the fuel.

When the tank according to the invention is a fuel tank, it preferably comprises an EVOH-based barrier layer located between the HDPE-based outer layers.

According to the invention, the tank is produced by molding a parison. The term "parison" is understood to mean a generally extruded preform of molten plastic that is intended to form the wall of the tank after molding to the required shapes and dimensions. This preform does not necessarily have to be a one-piece preform.

Thus, advantageously, the parison is in fact made up of two separate pieces, which may be two sheets, for example. However, these pieces preferably result from cutting one and the same extruded tubular parison as described in the aforementioned Application EP 1 110 697, the content of which is, for this purpose, incorporated by reference in the present application. According to this variant, once a single parison has been extruded, this parison is cut over its entire length, along two diametrically opposed lines, to obtain two separate portions (sheets).

Compared with the molding of two separately extruded sheets, of constant thickness, this approach allows the use of parisons having a variable thickness (that is to say a thickness that is not constant over their length), which are obtained by a suitable extrusion device (generally an extruder provided with a die having a positionally-adjustable mandrel). Such a parison takes account of the thickness reduction that occurs during molding at certain points on the parison, as a result of non-constant levels of deformation of the material in the mold.

After a parison has been molded in two pieces, these pieces generally form the lower and upper walls respectively of the fuel tank, each having an inner surface (pointing towards the inside of the tank) and an outer surface (pointing towards the outside of the tank).

The mold used in the process according to this variant of the invention preferably comprises a core, i.e., a part of suitable size and shape for being able to be inserted between the cavities of the mold when the parison is located therein and to fasten thereto the components inside the tank without the edges of the parison being welded (since the core must be removed before the final molding of the tank, a step during which the welding of the parison sections is carried out). Such a part (core) is, for example, described in Patent GB 1 410 215, the content of which is for this purpose incorporated by reference into the present application.

This mold also preferably comprises two cavities that are intended to be in contact with the outer surface of the parison, the parison being molded by blow molding (pressing the parison against these cavities using a pressurized gas injected inside the parison) and/or by thermoforming (drawing a vacuum behind the mold cavities).

Preferably, it takes place by blow molding, but preferably while also providing suction (drawing a vacuum) behind the cavities to keep the parison in the mold when the latter is not closed and pressurized. Hence, it preferably comprises a degassing step prior to step (6) of the process that will be described below. Generally, in order to do this the parison is first pierced (for example by puncturing it with a needle) and then the fluid is discharged from the mold (for example using a valve).

In the process according to the invention, the accessory is fastened to the inner surface of the paraison by snap-riveting, preferably after the parison has been pre-blow molded, i.e., stuck to the cavities of the mold. In the variant explained above, according to which the parison is in 2 sections and is molded using a mold comprising cavities and a core, this snap-riveting is preferably carried out using a device attached to the core that generally comprises a jack.

Hence, one particularly preferred variant of the process according to the invention comprises the following steps:

step 1. the parison is introduced into the mold cavities;
step 2. the core is introduced inside the parison, said core having first been fitted with the accessory and its connector;
step 3. the mold is closed so that the cavities come into leaktight contact with the molded core;
step 4. the parison is pressed against the cavities by blowing through the core and/or applying a vacuum behind the cavities;
step 5. the accessory is fastened to the parison by snap-riveting using a device attached to the core;
step 6. the mold is opened to withdraw the core; and
step 7. the final molding of the parison is carried out by blow molding (by injecting a pressurized gas inside the parison) and/or thermoforming (by applying a vacuum behind the cavities), and in this process, before carrying out the snap-riveting, the parison is locally deformed so as to surround the snap-riveting zone with a dome (or a relief that is concave when seen from the outside of the tank and convex when seen from the inside), the snap-riveting zone being also in relief (hollow) compared to the rest of the accessory.

Generally, the accessory is fixed to the tank wall through at least 2 fixation points, preferably at least 3 among which, according to the invention, at least one is a snap-rivet made in situ on a dome of the tank wall through an orifice (opening) in a portion in relief of the accessory (in one piece with it or fixed to it), said relief being "hollow" i.e., concave when compared with the rest of the surface of the accessory in contact with the tank wall.

This implies generally that the dome(s) (in the tank wall) and the "holes" in the accessory where snap-riveting occurs, are of smaller dimensions than the accessory.

In practice, said dome(s) may be produced with the aid of a boss in the cavities of the mold, i.e., a relief of complementary shape.

The dimensions and the shape of this dome are generally dependent on the geometry of the tank and of the accessory, in particular in the area of the snap-riveting orifice. Generally, this dome has a substantially circular cross section having a diameter of a few centimeters, for example from 2 to 5 cm, and a height ranging from 1 to 15 mm, preferably from 2 to 8 mm. The snap-riveting orifice itself preferably has a diameter greater than 1 cm, even at least equal to 2 cm.

Within the context of the invention, the term "accessory" is understood to mean:
  any functional object or device which is generally associated with the fuel tank in its usual mode of use or operation and which cooperates with the latter in order to fulfil certain useful functions; or
  a support for one or more such devices.

Non-limiting examples of such devices are: liquid pumps, level gauges, delivery tubes, reservoirs or baffles internal to the fuel tank, ventilation devices (valves, pipes, etc.), electronic units and stiffening bars.

According to one advantageous way of implementing the process according to the invention, the accessory is in fact a preassembled structure comprising a support and one or more identical or different devices that are fastened thereto via any suitable fastening means. Examples of these means are clip-fastening, screw-fastening, welding, etc. It is also advantageous for the preassembled structure to bear means allowing additional devices to be joined that would be possibly fastened subsequently. These means are also clip-fastening devices, capped holes or threaded protuberances of circular shape for screwing, surface regions that can be welded, etc. Within the same concept, the accessory may consist of a simple support that includes suitable means for subsequently fastening one or more devices. In other words, the accessory preferably includes a support that is either provided with fastening means, for one or more functional devices of the fuel tank (and which may be the cover of the accessory), or bears one or more such devices directly.

According to the invention, the accessory comprises at least one orifice that enables the snap-riveting (common technique in the field of metallurgy that consists in molding a rivet in situ, from molten material that has been made to overflow through an orifice in the part to be fastened and then left therein to solidify, preferably after having somewhat flattened the part that has overflowed to give it the shape of a rivet).

According to one advantageous variant of the invention, described in the aforementioned Application PCT/EP 2008/ 059042, the snap-riveting orifice or orifices are surrounded by a concave relief. The term "concave" is in fact understood to mean a hollow shape without a cover, the base of which is formed by the portion of the accessory surrounding the orifice or orifices. This relief may consist of a substantially cylindrical wall that is substantially perpendicular to the wall of the tank. It may have a continuous or discontinuous side wall. It is preferably discontinuous, or in any case: provided with openings that confer a certain mobility (deformability) on this relief and/or allow a visual inspection of the snap rivets (for example, with the aid of a camera: see further on).

This relief may comprise a tongue or protuberance, the purpose of which is to ensure the clamping of the component (i.e. its fastening to the core, for example using a small piston which props up the tongue). The fact of maintaining (clamping) the component very close to its fastening tab makes it possible to ensure that this tab is completely taken charge of by the tool and therefore positioned in a good location relative to this. If the clamping is carried out too far from the fastening tab, the tab of the component cannot be attached to a good location following deformation of the material between the tab and the clamping point.

In the case where the orifice is located at one end of a fastening tab (or of any other part of the accessory), the concave relief may be produced in a simple extension of the wall of this tab/part. In this embodiment, the "hole" in the accessory (concave recess for snap-riveting, generally complementary to the dome on the tank wall) is obtained by raising the free end of the tab versus the inferior surface of the accessory (that will be in contact with the tank wall outside the snap-riveting zone).

In the context of the invention, although the accessory is fastened to the wall of the tank at least one point (in this case: by snap-riveting), it is preferred that it can move relative to its fastening point on the wall of the tank.

This mobility may be obtained in various ways. In the case where the accessory comprises at least one fastening tab, it is sufficient to ensure that this is in the form of a flexible tongue, i.e., a part that is flat (but which may be curved, folded, etc.) having a thickness, a shape and/or a constituent material that give the accessory a relative mobility with respect to the wall of the tank when it is fastened thereto. Preferably, each of the points where the accessory is fastened to the tank is provided with such a flexible tongue.

For bulky and/or large-sized objects, according to one advantageous variant of the invention, the accessory is fastened to the parison both by snap-riveting and by welding. Most particularly preferably, the welding takes place by virtue of an attached part or connector comprising welding platforms. Advantageously, these welding platforms have the shape of a curved double lip. The welding platforms of the connector must be situated at a location and have dimensions such that during the snap-riveting they at least partially melt and enable the welding of the connector to be carried out.

Figure 2:
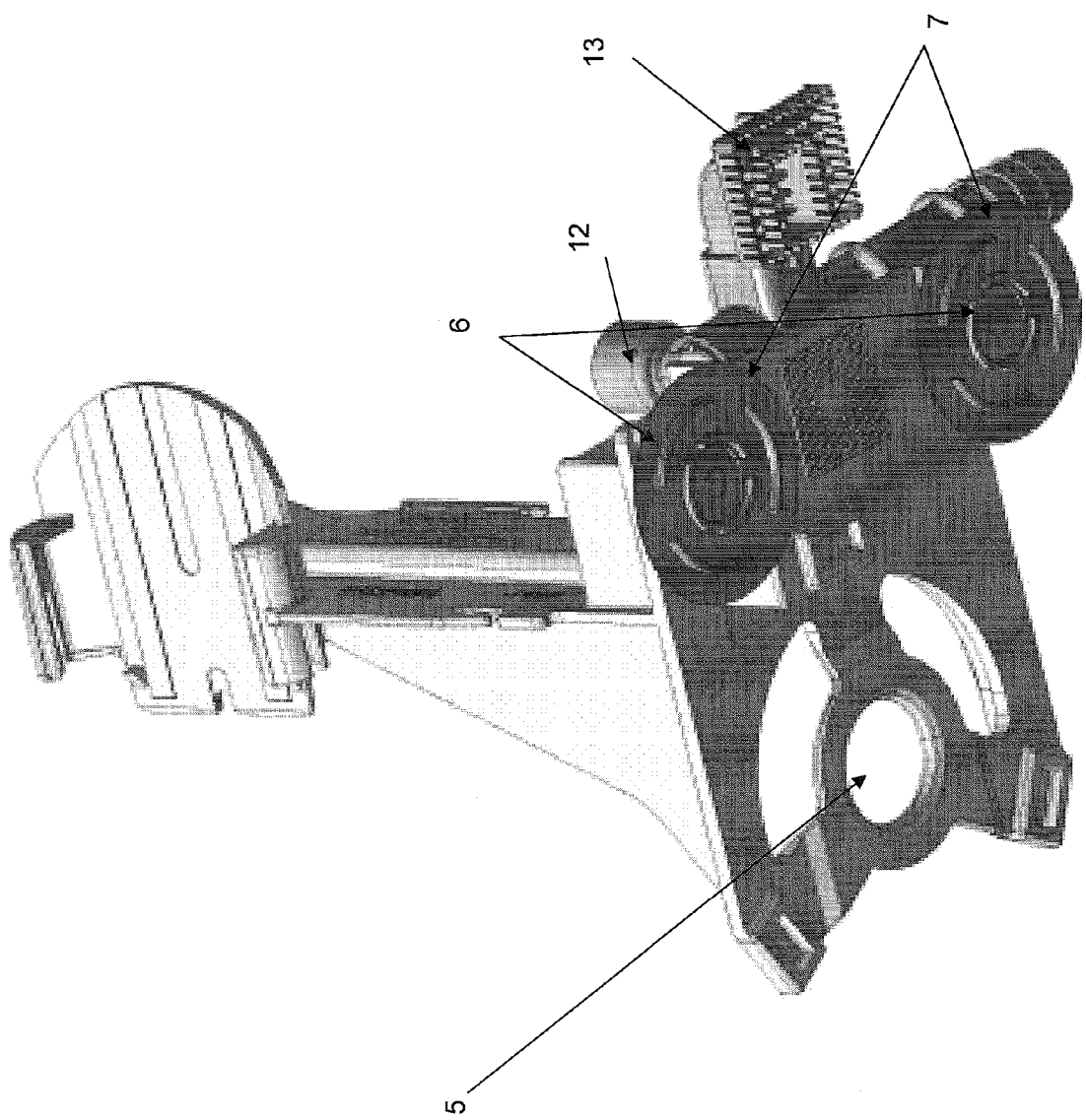
FIG. 2 illustrates another view of the same accessory (gauge support) as illustrated in FIG. 1.
Figure 3:
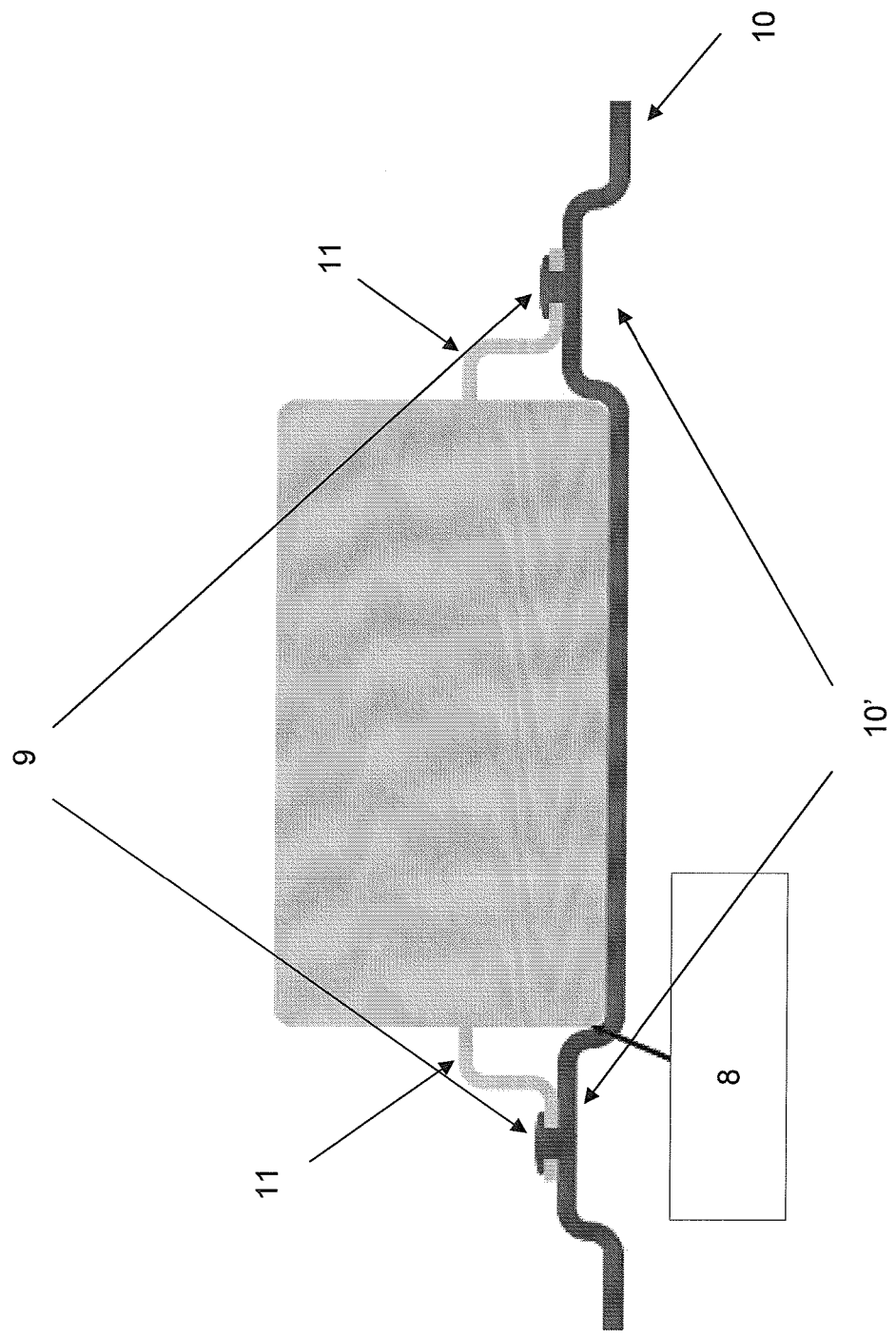
FIG. 3 illustrates a schematic view of a tank base where another accessory (a swirl pot) is fastened.

The present invention is illustrated in a non-limiting way by the appended FIGS. 1 to 3. FIGS. 1 and 2 illustrate two different views of one and the same accessory intended for the process according to one variant of the invention and FIG. 3 illustrates a schematic view of a tank base where another accessory is fastened.

The accessory represented in FIGS. 1 and 2 is a gauge support for a fuel tank that comprises a snap-riveting orifice (5) and reliefs or welding platforms (6) positioned on a stop surface (7), the purpose of which is to limit the penetration of the accessory into the molten plastic. As can be seen in this figure, the snap-riveting zone surrounding the orifice (5) is set back by 1 mm relative to the stop surface (7) so that the snap-riveting can be carried out at the same time as the welding, despite the fact that it takes place over a zone in relief (dome) of the parison. To the right of this zone, the cavities of the mold (not represented) have a boss, i.e., a zone in relief of complementary shape.

The gauge support illustrated in FIGS. 1 and 2 is used to support a gauge intended for a secondary pouch of a saddle tank. It is hence equipped with a venturi (12) that is intended to suck up fuel in the bottom of this pouch through a filter (13) equipped with teeth and that is molded (preferably by injection molding) from one part with it. The advantage of this geometry is that the height of the teeth may easily be adapted to the geometry of the bottom of the pouch for which the gauge and the venturi are intended. For this it is sufficient to equip the injection-molding mold with a mobile and/or interchangeable part.

The accessory (8) represented in FIG. 3 is a swirl pot comprising a pump-gauge module (not represented). This accessory is fastened using snap rivets (9) to the bottom wall of an FT (10), these snap rivets being rivets formed from the actual wall (10) and this being to the right of domes (10') which have been molded with the aid of a boss present in the cavities of the mold used to mold the FT from a molten plastic parison.

The orifices through which the snap rivets (9) have been formed are located on flexible fastening tabs (11).

The invention claimed is:

1. A process for fastening an accessory to a hollow body obtained by molding a molten plastic parison, this process for fastening comprises:
    snap-riveting with the aid of a tool during the actual molding of the parison, and
    before carrying out the snap-riveting, locally deforming the parison to surround a snap-riveting zone with a dome which is a relief that is concave when seen from an outside of the hollow body and convex when seen from an inside of the hollow body, the snap-riveting zone being also on the relief, and the relief extends farther inside the hollow body compared to a surface of the accessory in contact with the hollow body, and the dome including a smaller length dimension than a length dimension of the accessory.

2. The process according to claim 1, wherein the parison is made up of two separate pieces originating from one and the same extruded tubular parison that is cut over its entire length, along two diametrically opposed lines.

3. The process according to claim 2, wherein the parison is molded using a mold comprising cavities and a core, and wherein the process comprises:
    introducing the parison into the mold cavities;
    introducing the core inside the parison, said core having first been fitted with the accessory and its connector;
    closing the mold so that the cavities come into leaktight contact with the core;
    pressing the parison against the cavities by at least one of blowing through the core and applying a vacuum behind the cavities;
    fastening the accessory to the parison by snap-riveting using a device attached to the core;
    opening the mold to withdraw the core; and
    carrying out final molding of the parison by at least one of blow molding and thermoforming.

4. The process according to claim 3, wherein the dome is produced with the aid of a boss in the cavities of the mold.

5. The process according to claim 1, wherein the dome has a substantially circular cross section having a diameter of 2 to 5 cm and a height of 1 to 15 mm.

6. The process according to claim 1, wherein the accessory comprises at least one orifice that enables the snap-riveting, and wherein said orifice is surrounded by a concave relief.

7. The process according to claim 1, wherein the accessory is fastened to the parison both by snap-riveting and by welding.

8. The process according to claim 7, wherein the welding takes place by virtue of an attached part or connector comprising welding platforms.

9. The process according to claim 8, wherein the welding platforms have the shape of a curved double lip.

10. The process according to claim 1, wherein the hollow body is a tank for a motor vehicle.

11. The process according to claim 10, wherein the accessory is movable relative to its corresponding fastening point on the tank.

12. A process for fastening an accessory to a hollow body obtained by molding a molten plastic parison, this fastening taking place by snap-riveting with the aid of a tool during the actual molding of the parison, according to which, before carrying out the snap-riveting, the parison is locally deformed so as to surround a snap-riveting zone with a dome, the snap-riveting zone being also in relief compared to a surface of the accessory in contact with the hollow body, wherein
    the accessory is fastened to the parison both by snap-riveting and by welding, and the welding takes place by virtue of an attached part or connector comprising welding platforms.

13. The process according to claim 12, wherein the welding platforms have the shape of a curved double lip.

14. The process according to claim 1, wherein an entirety of the dome is positioned lateral of the surface of the accessory in contact with the hollow body.

15. The process according to claim 1, wherein more than one of the dome are positioned lateral of the surface of the accessory in contact with the hollow body.

\* \* \* \* \*